(12) United States Patent
Libakken (10) Patent No.: US 7,305,737 B2
(45) Date of Patent: Dec. 11, 2007

(54) ROLLER/FOOT DEVICE CASTOR (75) Inventor: Rolf Libakken, Båtsfjord (NO)

(73) Assignee: Click Wheel AS, Skoyen, Oslo (NO)

( * ) Notice: Subject to any disclaimer, the term of this patent is extended or adjusted under 35 U.S.C. 154(b) by 146 days.

(21) Appl. No.: 10/522,841

(22) PCT Filed: Jul. 17, 2003

(86) PCT No.: PCT/NO03/00249
§ 371 (c)(1),
(2), (4) Date: Mar. 15, 2005

(87) PCT Pub. No.: WO2004/018232
PCT Pub. Date: Mar. 4, 2004

(65) Prior Publication Data
US 2006/0112514 A1    Jun. 1, 2006

Related U.S. Application Data

(60) Provisional application No. 60/399,137, filed on Jul. 30, 2002.

(30) Foreign Application Priority Data
Aug. 9, 2002    (NO) .................................. 20023796

(51) Int. Cl.
*B60B 33/00* (2006.01)
(52) U.S. Cl. ..................................................... 16/35 R
(58) Field of Classification Search ............... 16/35 R, 16/26, 30, 34, 43, 18 A; 248/188.9, 188.8, 248/188; 280/47.38, 47.22, 86.751, 11.205, 280/43; 188/1.12, 25
See application file for complete search history.

(56) References Cited

U.S. PATENT DOCUMENTS

| 1,834,345 A | * | 12/1931 | Nelson | 297/270.5 |
| 2,173,950 A | * | 9/1939 | Parkhill | 16/21 |
| 2,175,551 A | * | 10/1939 | Perry | 242/413.7 |
| 2,709,827 A | * | 6/1955 | Volz | 16/33 |
| 3,337,230 A | * | 8/1967 | Golding | 280/87.03 |
| 3,349,425 A | * | 10/1967 | Reabelos | 16/44 |
| 4,402,108 A | * | 9/1983 | Pannwitz | 16/26 |
| 5,590,735 A | | 1/1997 | Cartier | |
| 6,473,935 B1 | * | 11/2002 | Cherukuri | 16/33 |

FOREIGN PATENT DOCUMENTS

DE    2615266    10/1977

(Continued)

*Primary Examiner*—Chuck Y. Mah
(74) *Attorney, Agent, or Firm*—Christian D. Abel (57) ABSTRACT

A roller/foot device (1) comprising a cylindrical outer sleeve (10), a guide sleeve (20) arranged inside the outer sleeve (10), locking sleeve (30) arranged inside the outer sleeve (10), a spring device where one end abuts against the outer sleeve's closed end (13) and the other end abuts against one end portion of the guide sleeve or the locking sleeve and a roller element (41) which is rotatably mounted abutting against the locking sleeve's (20) end portion which is located at the extreme end of the outer sleeve (10). The sleeves comprise ribs which can slide towards each other and cause the roller element (41) to assume different positions in the longitudinal direction of the outer sleeve (10) when the device (1) is subjected to forces. The device (1) can thereby be employed as a roller device with the roller element (41) in an outer position and as a foot device with the roller element (41) in an inner position.

9 Claims, 8 Drawing Sheets

FOREIGN PATENT DOCUMENTS

| | | |
|---|---|---|
| DE | 2705958 | 8/1978 |
| DE | 19801509 | 7/1998 |
| EP | 0153832 | 9/1985 |
| EP | 394555 A1 * | 10/1990 |
| EP | 0562483 | 3/1993 |
| FR | 9113711 | 8/1993 |
| GB | 2246951 | 2/1992 |
| JP | 10082264 A * | 3/1998 |
| WO | WO 9105672 A * | 5/1991 |
| WO | WO 92/19463 | 11/1992 |

* cited by examiner

ROLLER/FOOT DEVICE CASTOR

This application claims the benefit under 35 USC §119(e) to U.S. Provisional Application 60/399,137 filed, 30 Jul. 2002.

FIELD OF THE INVENTION

The present invention relates to a device for moving an object by means of a roller device which can be concealed in a sleeve body.

BACKGROUND OF THE INVENTION

Roller devices are often employed when moving objects in order to reduce the load and facilitate maneuvering. The roller devices may be directly attached to the object that has to be moved, either releasably or as an integrated part of the object. The object may also be placed on a support unit equipped with roller devices. Objects and support units equipped with roller devices and used for moving objects are often also required to be capable of assuming a stationary position.

One solution for achieving such a position will be to equip the roller devices with brake means. Particularly when using roller devices on objects where a high degree of stability is required, and especially where the objects in themselves are heavy or are carriers of heavy and/or unstable loads, it will often not be sufficient to equip the roller device with ordinary brake means. This applies particularly in connection with furniture elements and objects which have to remain stationary for a lengthy period.

It is therefore an object of the present invention to provide technical solutions whereby an object can both be moved and will be capable of achieving a position where the object remains stationary relative to the base.

An arrangement of this kind for permitting an object to both be moved and remain stationary is known from DE 198 01 509. In this publication a device is described for achieving easy displacement of a piece of furniture, using a roller body and a spring mounted in a sleeve which forms part of the leg of a piece of furniture. When the furniture is unloaded, the spring will push the roller body out of the chair leg into a position where the furniture can be moved. When the furniture is loaded against the ground, the roller body is pressed into the leg of the furniture and in this condition the furniture will remain stationary relative to the base.

In the solution disclosed in DE 198 01 509 the device is not equipped with means or arrangements for securing the roller body in the rolling position. A drawback of the solution disclosed in DE 198 01 509 is that if the furniture is loaded or the actual roller body meets an obstacle on the floor, the furniture's capacity to move will be diminished, since the roller body will be partly or entirely pushed into the sleeve.

EP 0153832 illustrates a furniture castor which can be moved between a retracted position and an extended position. The castor is attached to a rod connected to two elements with cam-shaped surfaces which control the position of the rod.

Both of the above-mentioned solutions are bulky and unsuitable for being fitted to many types of furniture, since they require too much space as well as spoiling the aesthetic appearance of the object to which they are attached.

The object of the present invention is to provide a solution which improves the disadvantages of the technical solution known from DE 198 01 509. In particular, it is an object of the present invention to achieve a solution which is small and compact and which ensures that during displacement the roller device is kept in a rolling position and is not unexpectedly pushed into the sleeve.

SUMMARY OF THE INVENTION

The above objects of the invention are achieved by means of the features in the patent claims.

The solutions proposed in the present invention may be employed together with objects within a number of areas of application. These may include furniture elements, television sets, trolleys for use in warehouses, laboratories, factories or workshops, etc. The invention will be ideally suited for transport of objects which particularly require a smooth and precise pattern of movement, etc.

The invention may be employed in connection with moving objects not only along a base which is horizontally oriented, but also along inclined and vertical bases.

In an embodiment the invention may be envisaged provided in such a manner that the sleeves can be removably mounted directly on to the object that requires to be moved. In such an embodiment a support unit in the form of a trolley or the like for moving objects will be rendered superfluous.

The invention is small and compact and will therefore be suitable for mounting on many types of objects and will have little or no effect on the object's appearance.

In an embodiment the sleeve may be equipped with ball bearings, thus providing a rotatable attachment to the movable object. In an embodiment an outer sleeve may be employed for mounting the sleeve in which the roller device is to be received. The roller device to be employed according to the invention may be in the form of a wheel, a ball or another body which is capable of generating movement directly in contact with a base.

In principle the roller/foot device according to the invention comprises an outer sleeve, a spring device, a guide sleeve and a locking sleeve adapted to be able to be inserted into the outer sleeve and a roller element.

In an embodiment the roller/foot device also comprises several ball bearings and a locking ring.

In a further embodiment the roller device also comprises a bearing ring mounted in the locking sleeve inside the locking ring.

The outer sleeve is in the form of a hollow cylinder where one end is completely or partly closed by an end surface and one end is open. The inner wall of the outer sleeve comprises first elongated ribs extending in the outer sleeve's longitudinal direction. The ribs are arranged in parallel round the sleeve's circumference with grooves between. One end surface of the ribs is inclined and comprises a step (catch). In an embodiment, on the outside of the outer sleeve are mounted tension elements which may, e.g., be cut out of the actual outer sleeve and which protrude slightly from the outer surface of the outer sleeve. These tension elements are flexible and can be pressed into alignment with the outer sleeve's outer surface, in which case they will exert an outwardly directed counterforce.

The guide sleeve and the locking sleeve are cylindrical with an external diameter which is slightly smaller than the inner diameter of the outer sleeve, with the result that they fit closely into the outer sleeve. The guide sleeve's outer wall comprises second ribs adapted to fit into the grooves between the first elongated ribs on the outer sleeve when the guide sleeve is inserted into the outer sleeve. The end surfaces of the second ribs are also inclined, and the end portions advantageously comprise two inclined surfaces with opposite inclination, with the result that the end portion is v-shaped. The guide sleeve's end portion can act as an abutment for a spring device when the guide sleeve is inserted into the outer sleeve, for example by one end of the guide sleeve comprising an end surface. The spring device also abuts against the inside of the outer sleeve's end surface and may be attached thereto, with the result that it is located between the outer sleeve and the guide sleeve. The purpose of the outer sleeve's end surface is to provide abutment for the spring device and it may be designed in a suitable manner, such as, for example, a whole surface, a surface with one or more holes, ribs, etc. Alternatively, the spring device may abut against the locking sleeve's end portion.

The locking sleeve's outer wall comprises third ribs with the same width, arranged at the same distance apart as the second ribs, where the end surface of the third ribs is inclined at an angle which is adapted to the first ribs' inclined end portions and abuts against the second ribs' end portions.

The roller element is attached abutting against the locking sleeve's end portion which faces outwards towards the outer sleeve's open end, thus enabling the roller element to rotate. In a preferred embodiment the roller element is a ball, but it may also comprise a wheel mounted rotatably against the locking sleeve, or another suitable rotatable element. The ball is made of a hard material, such as for example steel, plastic or the like, to enable it to run easily over the base. In a preferred embodiment the ball is made of a softer core with a hard outer shell.

In a further embodiment the locking sleeve also comprises a cup-shaped recess in the end facing out towards the outer sleeve's open end, the recess being adapted to receive several ball bearings and the roller element. The ball bearings are provided in the recess between the locking sleeve and the roller element, thus enabling the roller element to roll on the ball bearings with minimal friction. The roller element and the ball bearings are kept in the recess by means of a locking ring. The locking ring is adapted to be able to be clamped into the locking sleeve and has an aperture of such a size that the roller element protrudes slightly from the ring and can roll against a surface. In an embodiment the locking ring has inclined abutment surfaces, thus providing the roller element with a smooth rotational motion.

Placing the roller element in the recess also contributes towards making the device according to the invention small and compact.

The bearing ring featured in the further embodiment of the invention is a ring which is adapted to be located between the locking ring and the ball bearings. The bearing ring comprises at least one spring mechanism such as, e.g., flexible teeth to prevent the ball bearings from coming too far down along the sides of the roller element with the result that there are very few ball bearings at the top of the roller element and thereby considerable point loading on both the roller element and the locking sleeve's recess. The spring mechanism improves the circulation of ball bearings round the roller element, thereby extending the life of the ball bearings and giving less rolling friction.

The roller/foot device may, for example, be used as a furniture castor by fitting it to the piece of furniture that has to be capable of being rolled. The attachment can be easily implemented by pressing the outer sleeve into a suitable aperture in the piece of furniture, for example a table leg, sofa leg or the like. The tension elements on the outside of the outer sleeve will then be pressed together, holding the roller device in position inside the aperture.

The weight of the furniture will then cause the roller element to be pressed inwards in the outer sleeve with a certain amount of force. The spring force from the spring device will exert a counterforce with opposite direction. When the force acting inwards in the outer sleeve is greater than the spring force, this will result in a movement of the guide sleeve and the locking sleeve inside the outer sleeve. The guide sleeve's ribs will slide in the grooves in the longitudinal direction between the outer sleeve's ribs and the end surfaces of the third ribs on the locking sleeve will slide towards the end surfaces of the first ribs in the outer sleeve, thus giving the locking sleeve a movement in the circumferential direction. This movement is stopped in one of two positions: 1) when the locking sleeve's ribs abut against the steps on the outer wall's ribs or 2) against the lateral edge of the outer wall's ribs. In the first case the inward movement of the guide sleeve and the locking sleeve in the outer sleeve is stopped before the roller element has been pushed all the way into the outer sleeve and in this position the roller element can roll freely. In this case the roller/foot element acts as a roller element. In the second case the inward movement of the guide sleeve and the locking sleeve in the outer sleeve is stopped after the roller element has been pushed all the way into the outer sleeve, with the result that the roller element is no longer able to roll over the base. In this case the roller/foot element acts as a foot element. If the base is hard, the roller element will be in abutment against the base, but the flexibility of the spring device causes the weight to rest on the outer sleeve. It is an advantage that the distance between the spring device's two abutments of the spring device is sufficiently large to ensure that the spring device is not completely compressed in the roller element's inner position in order to avoid instability.

To enable the guide and locking sleeves to continue their movements in the outer sleeve, the force acting inwards in the outer sleeve must be less than the force from the spring device, for example by lifting the furniture slightly. The roller element, the guide and locking sleeves are then pressed into their outermost position in the outer sleeve. When the furniture is then lowered back on to the floor, the sleeves will once more be moved as described above until they stop in the second position.

The device according to the invention may of course be used in connection with any object that requires to be moved. The device may be affixed to the object in many ways, such as for example by screwed connection, gluing, Velcro fastening, etc. in addition to the method of attachment described above.

When using surfaces which are easily marked or scratched, the outer edge of the outer sleeve may be protected by a pad of a suitable material such as foam, plastic, felt or the like. The pad will preferably be doughnut-shaped with an outer diameter equal to or larger than the outer sleeve's outer diameter and an inner diameter larger than or equal to the diameter of the protruding part of the roller element, in order to avoid obstructing the roller element's rolling motion.

BRIEF DESCRIPTION OF THE DRAWINGS

The invention and its mode of operation will be described in greater detail below with reference to the drawings.

DETAILED DESCRIPTION

Figure 1:
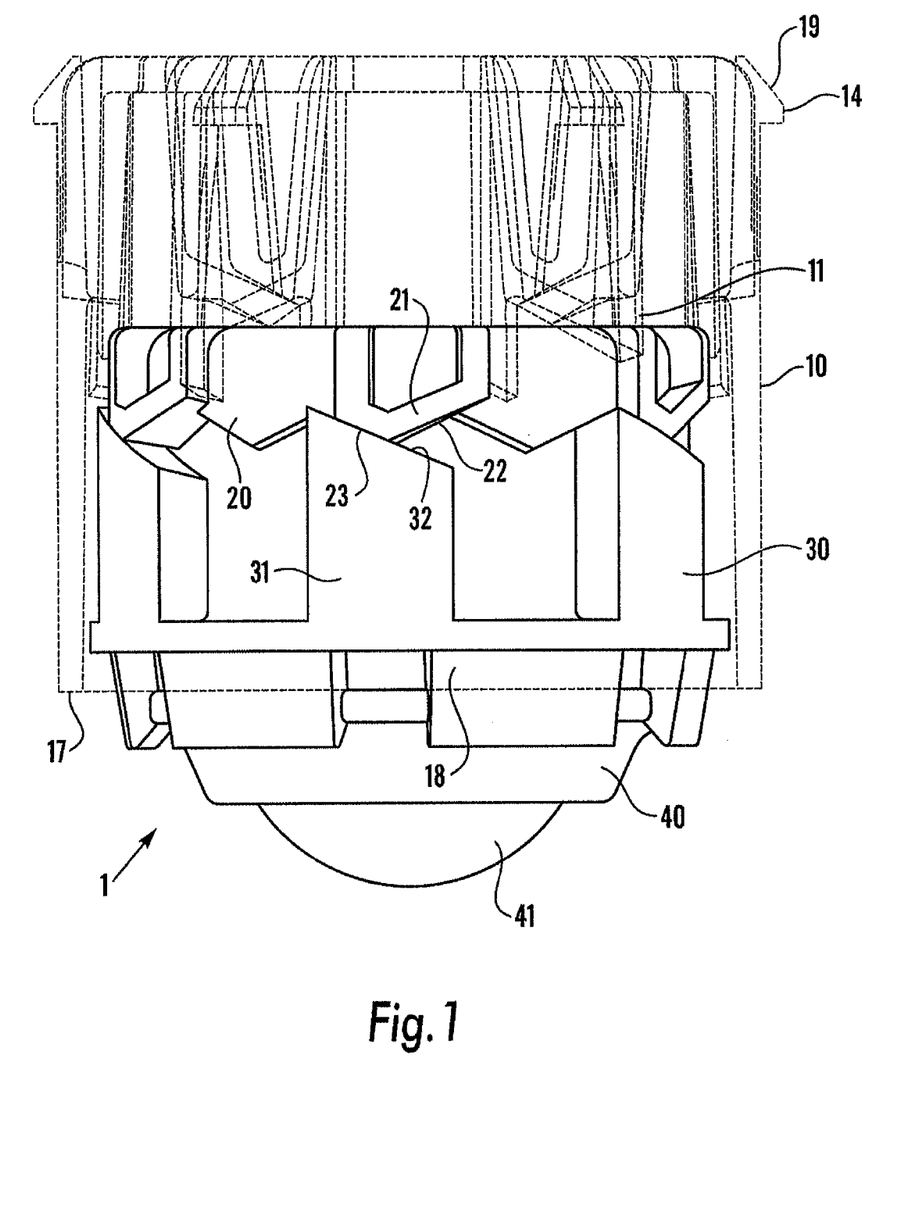
FIGS. 1-4 illustrate an embodiment of the present invention with roller ball, guide and outer sleeves in four respective positions.

FIG. 1 illustrates the device 1 according to the invention with no forces acting inwards in the outer sleeve 10. In this embodiment the roller element is a ball 41. In FIG. 1 the ball is kept in its outermost position in the outer sleeve 10 by the force from the spring device (not shown). The spring device presses the guide sleeve 20 outwards towards the outer sleeve's 10 open end 17. The ribs 21 on the guide sleeve slide in the grooves between the outer sleeve's ribs 11. The end surfaces (22,23) of the ribs 21 on the guide sleeve abut against the end surface 32 of the ribs 31 on the locking sleeve 30, and the locking sleeve 30 and thereby the ball 41 are thereby also pressed outwards towards the outer sleeve's 10 open end 17. In this embodiment the outer sleeve 10 has outwardly protruding edge pieces 18 which prevent the locking sleeve 30 and the guide sleeve 20 from being pushed out of the outer sleeve 10.

The ball 41 is attached against the locking sleeve 30 by means of a locking ring 40 which is clamped into the opening of the locking sleeve, with the result that a movement of the locking sleeve 30 along the outer sleeve's longitudinal direction leads to a corresponding movement of the ball 41.

In FIG. 1 tension elements 14 are also illustrated mounted round the outside of the outer sleeve 10. In this embodiment the tension elements 14 are produced by cutting out slots in the outer sleeve 10, but they may also be glued or attached to the outer sleeve in another suitable manner. The tension elements 14 have an outwardly protruding upper portion 19. When the device 1 is inserted in a hole for attachment to an object, the tension elements 14 are placed under tension against the walls of the hole, thus keeping the device 1 in position.

Figure 2:
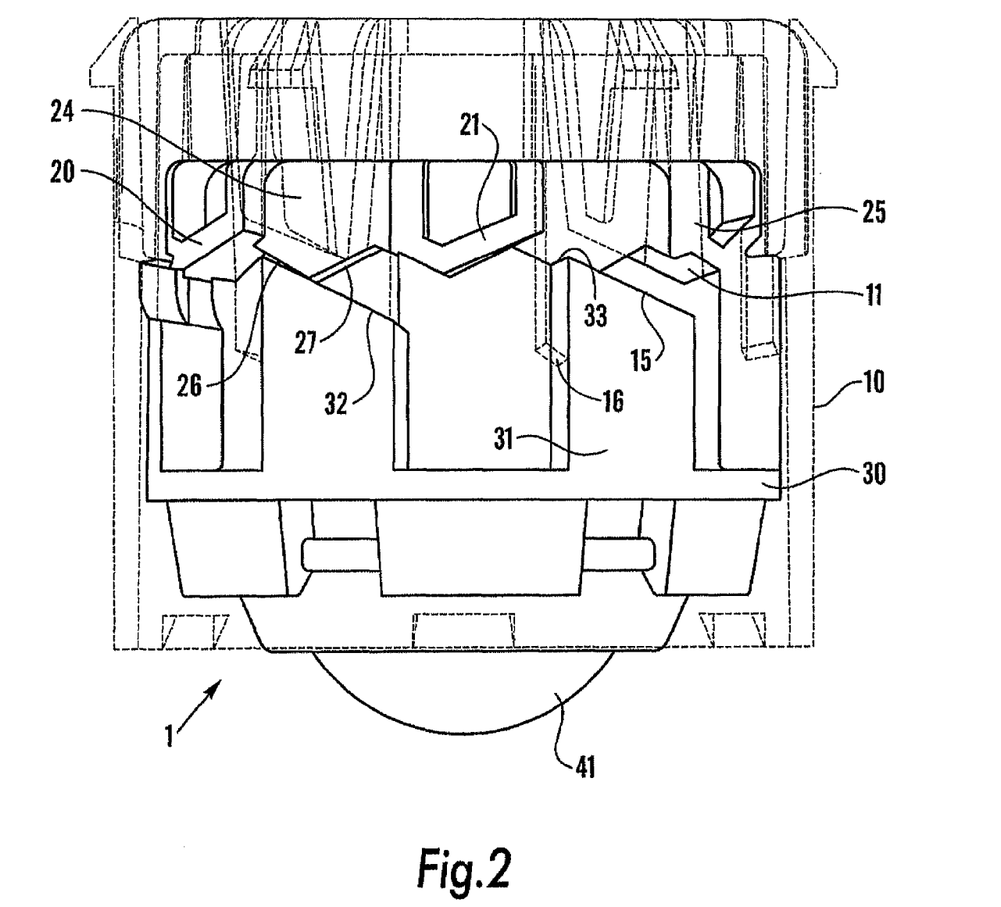

FIG. 2 illustrates the device 1 after an inward force in the outer sleeve has been applied to the ball 41 with initial position as illustrated in FIG. 1, for example by the weight of a piece of furniture pressing the device down against a floor. The locking sleeve 30 and the guide sleeve 20 are forced inwards until the end surfaces 32 of the locking sleeve's ribs 31 come into abutment against the end surfaces 15 of the outer sleeve's ribs 11 and slide against them until they stop against the steps 16 on the ribs in the outer sleeve. This sliding movement has given the locking sleeve 30 a rotating motion in the circumferential direction. Further inward movement of the ball 41, the locking sleeve 30 and the guide sleeve 20 in the outer sleeve 10 is prevented by the step 16 and in this position a part of the ball 41 protrudes outside the opening of the outer sleeve. In this position the ball 41 can rotate freely and the device 1 can be used as a castor for moving the object (for example a piece of furniture) to which it is attached. The grooves 24 between the ribs 21 on the guide sleeve 20 have end surfaces comprising two inclined surfaces 26, 27 with opposite inclination, thus making the end portion v-shaped. In this case the bottom of the "v" is located on the right of the step 16 in the inclined end surface 15 of the outer sleeve's ribs 11, with the result that the left-hand upper edge of the locking sleeve's ribs 31 abuts against the right-hand inclined end surface 26 of the guide sleeve's ribs.

Figure 3:
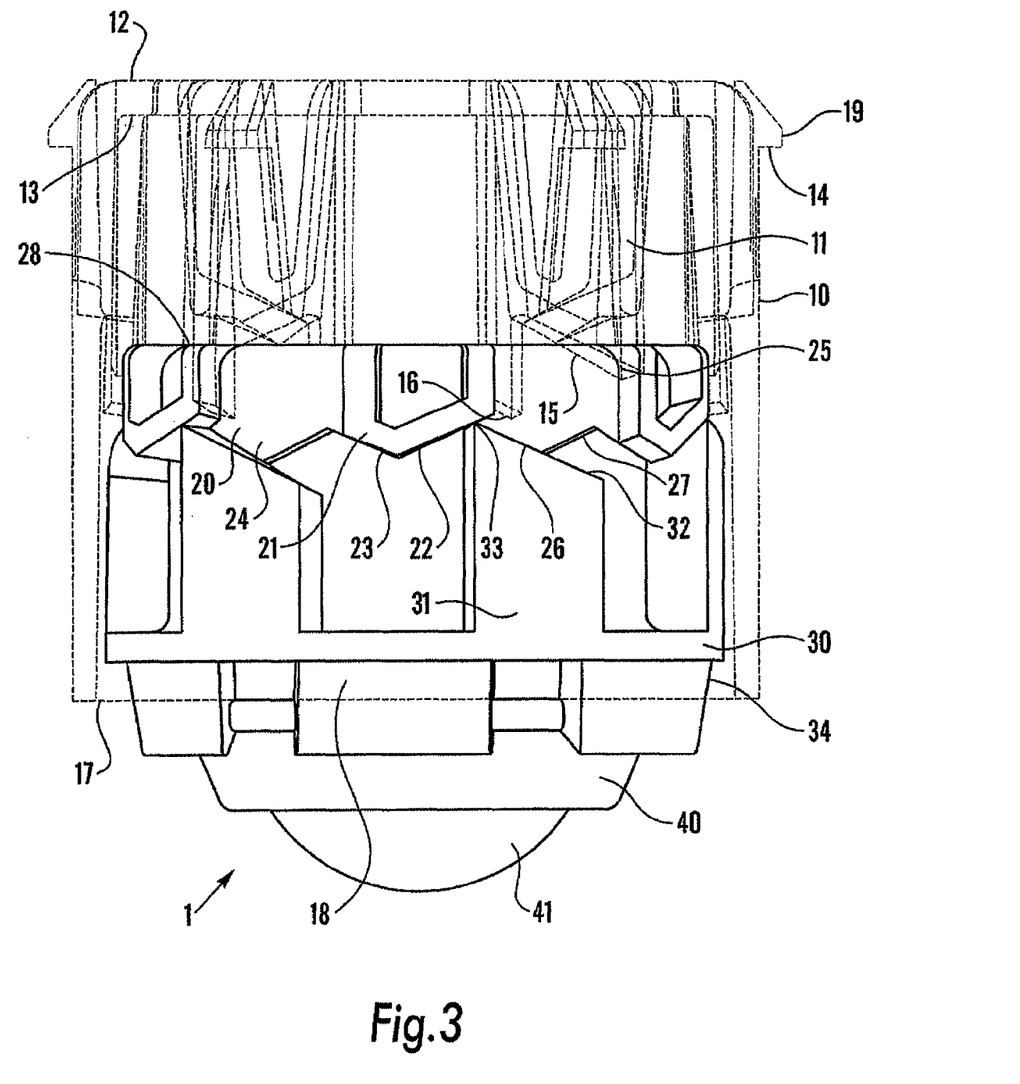

In FIG. 3 the device 1 as illustrated in FIG. 2 has been released from the external forces, for example by the object to which it is attached being slightly raised from the base.

The force from the spring device then presses the guide sleeve 20 towards the open end 17 of the outer sleeve 10. The locking sleeve's ribs 31, which are located in abutment against the left-hand inclined end surface 26 of the guide sleeve's groove, is also forced outwards towards the outer sleeve's open end and slides on the inclined end surface 26, thus giving the locking sleeve a movement in the circumferential direction past the step 16 on the outer sleeve's ribs 11. In this position the ball 41 is located in a position corresponding to the position in FIG. 1, furthest out of the outer sleeve 10.

Figure 4:
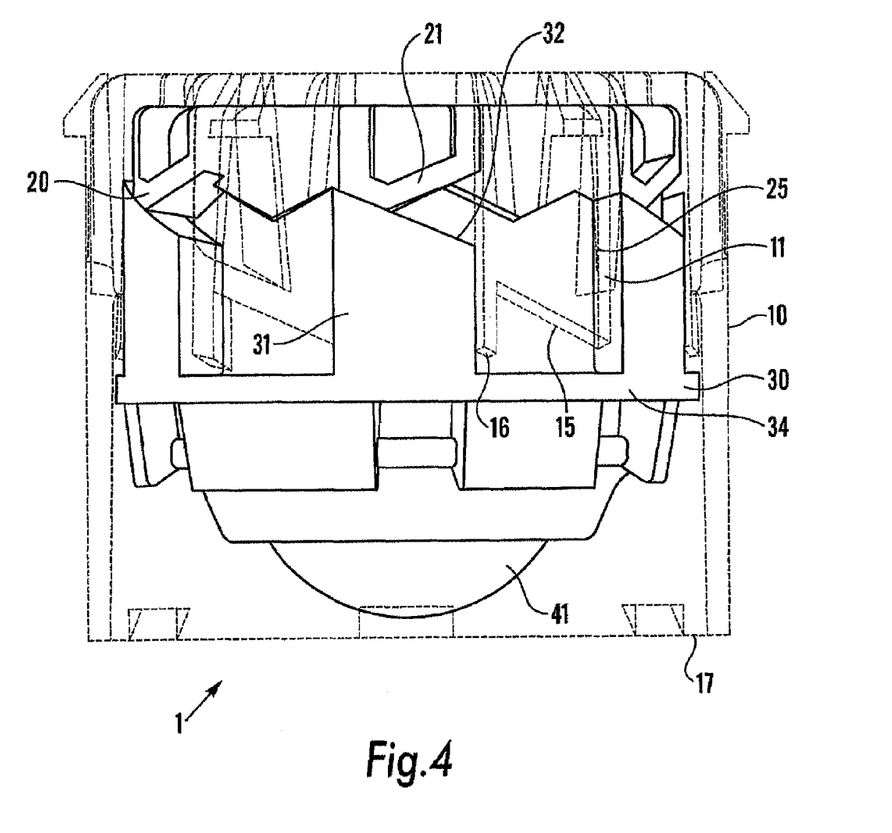

When the device 1 is once again exposed to external forces, i.e. with the ball 41 now in its initial position as in FIG. 3, for example by the weight of the object with castors again resting on the device 1, we obtain the situation illustrated in FIG. 4. The ball 41 and the locking sleeve 30 are forced inwards in the outer sleeve 10 until the end surface 32 of the locking sleeve's ribs 31 comes into abutment against the step 16 in the end surfaces 15 of the outer sleeve's ribs 11 and slides towards them until they pass the step 16, enters the grooves between the outer sleeve's ribs 11 and stops. This sliding movement has given the locking sleeve 30 a rotating motion in the circumferential direction. Further inward movement of the ball 41, the locking sleeve 30 and the guide sleeve 20 in the outer sleeve 10 is prevented by the outer edge 34 of the locking sleeve 30 abutting against the outer sleeve's ribs 11. In this position the whole ball 41 is in a retracted position aligned with or inside the outer sleeve's aperture 17. In this position the ball 41 is unable to roll over the base and the device 1 acts as a foot element.

By means of repeated application and release of forces on the device 1, the ball 41 will repeatedly assume the positions described above in sequence, thus permitting the device 1 to be easily moved from a rolling position to a foot position and vice versa.

In FIGS. 1-4 the ribs 21 on the guide sleeve 20 have two inclined surfaces with opposite inclination, thus making the end portion v-shaped. However, this end portion may also have other shapes, for example a rounded shape, asymmetrical v-shape, a inclined surface and a straight surface or the like, as long as it has the desired effect, viz. to guide the ribs 31 on the locking sleeve past the edge 25 or the step 16 of the ribs 11 on the outer sleeve 10 so that the end surface of the ribs 31 on the locking sleeve 30 comes into abutment against the end surfaces of the step 16 and the ribs 11 respectively.

Figure 5:
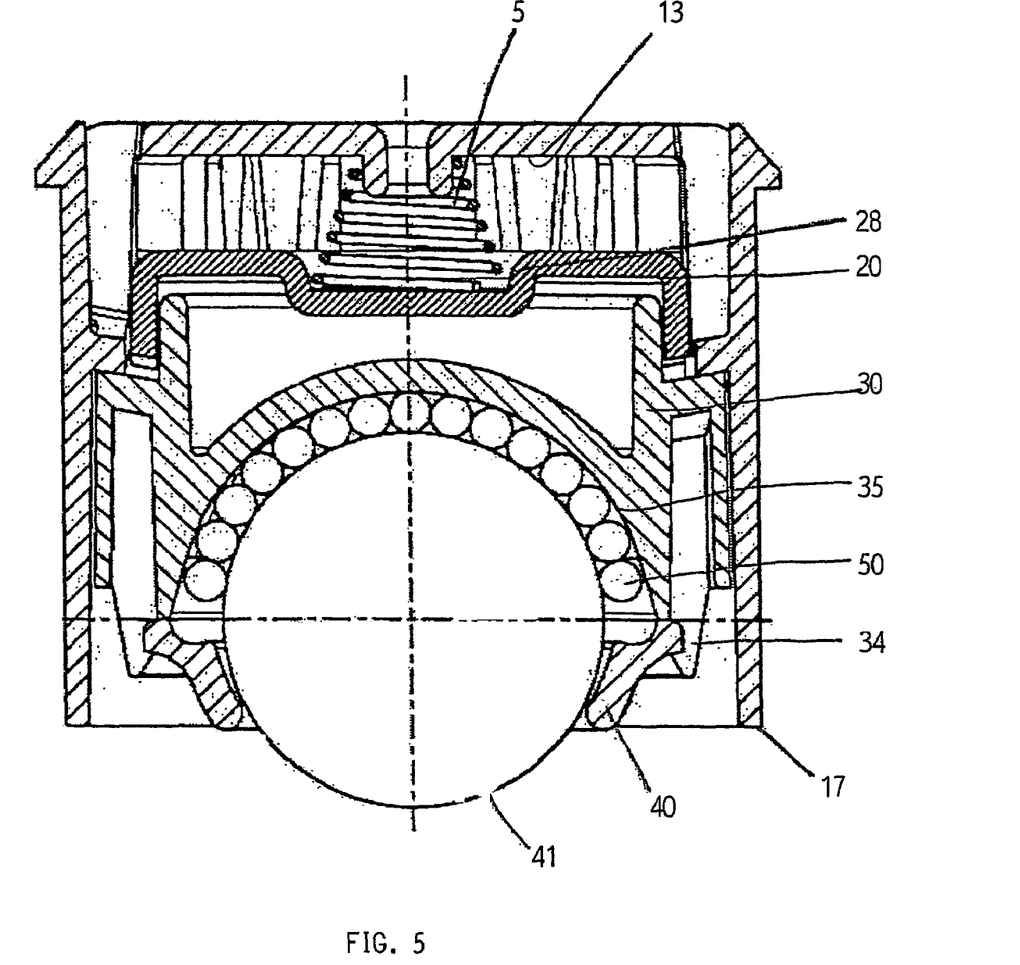
FIG. 5 illustrates a second embodiment of the invention where the roller element is mounted in the locking sleeve by means of universal mounting.

In FIG. 5 a second embodiment of the invention is illustrated where the ball 41 is mounted by means of universal mounting. In this case the locking sleeve 30 comprises a cup-shaped recess 35 in the end facing out towards the outer sleeve's open end. In the recess 35 are placed several ball bearings 50 and the ball 41 abuts against the ball bearings 50, thus enabling the ball 41 to roll with minimal friction. The ball 41 and the ball bearings 50 are kept in the recess 35 by means of a locking ring 40. The locking ring 40 is adapted to be able to be clamped into the locking sleeve 30 and has an aperture of such a size that the ball 41 projects slightly from the ring 40 and can roll against a surface.

FIG. 5 also illustrates the spring device 5 abutting against the inside of the outer sleeve's end surface 13 and the guide sleeve's 20 end surface 28.

Figure 6:
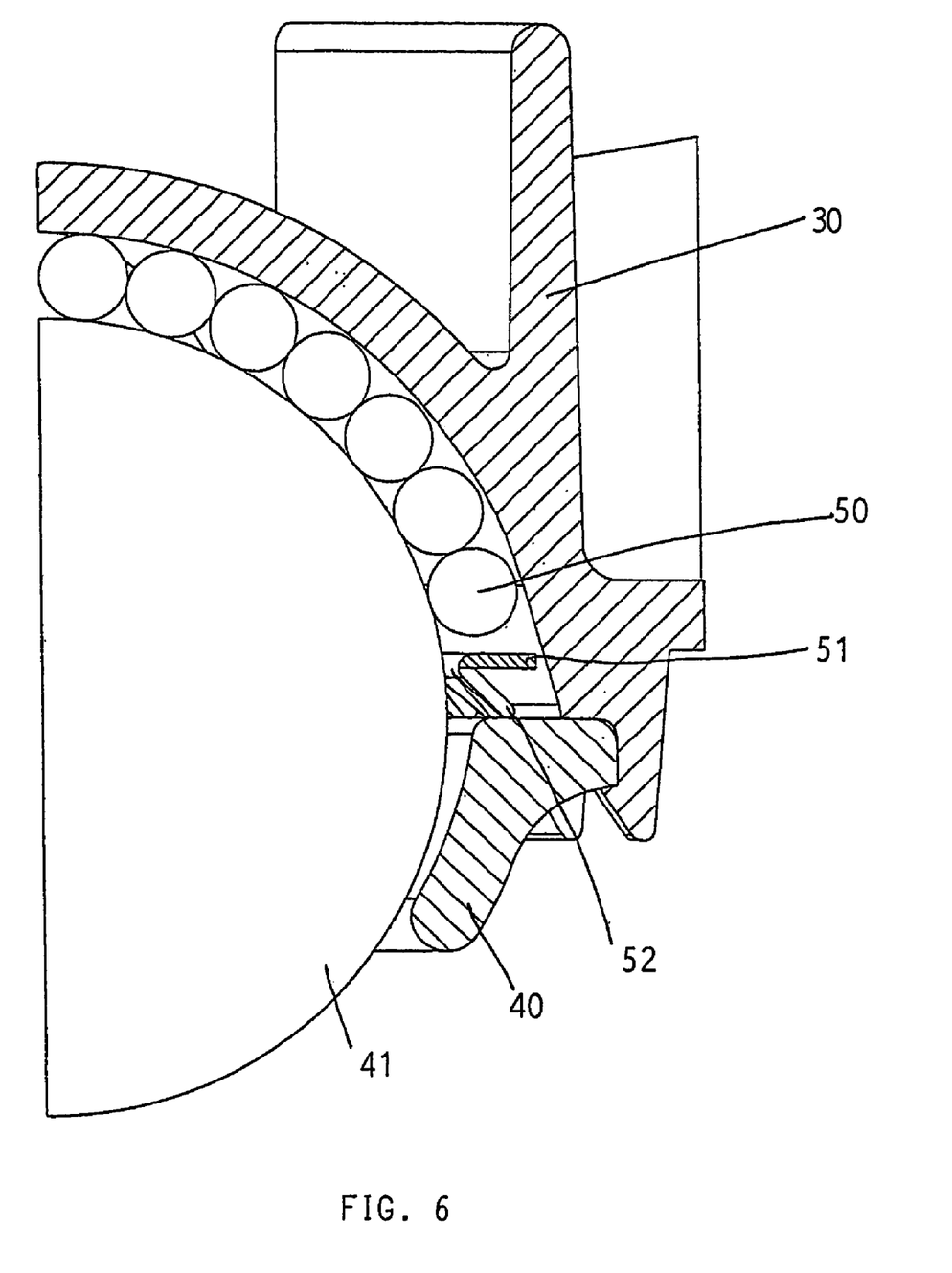
FIG. 6 illustrates a detail of a further embodiment of the invention where a bearing ring supports the ball bearings in FIG. 5.

FIG. 6 is a sectional view of a detail of a further embodiment of the invention. The bearing ring 51 is a ring which is adapted to be located between the locking ring 40 and the ball bearings 50. The bearing ring 51 comprises a spring mechanism 52 such as, e.g. flexible teeth to prevent the ball bearings from coming too far down along the sides of the ball 41, with the result that there are very few ball bearings at the top of the ball 41 and thereby considerable point loading on both the ball 41 and the locking sleeve's 30 recess. The spring mechanism 52 also improves the circulation of ball bearings 50 round the ball 41, thereby extending the life of the ball bearings 40 and giving less rolling friction.

Figure 7:
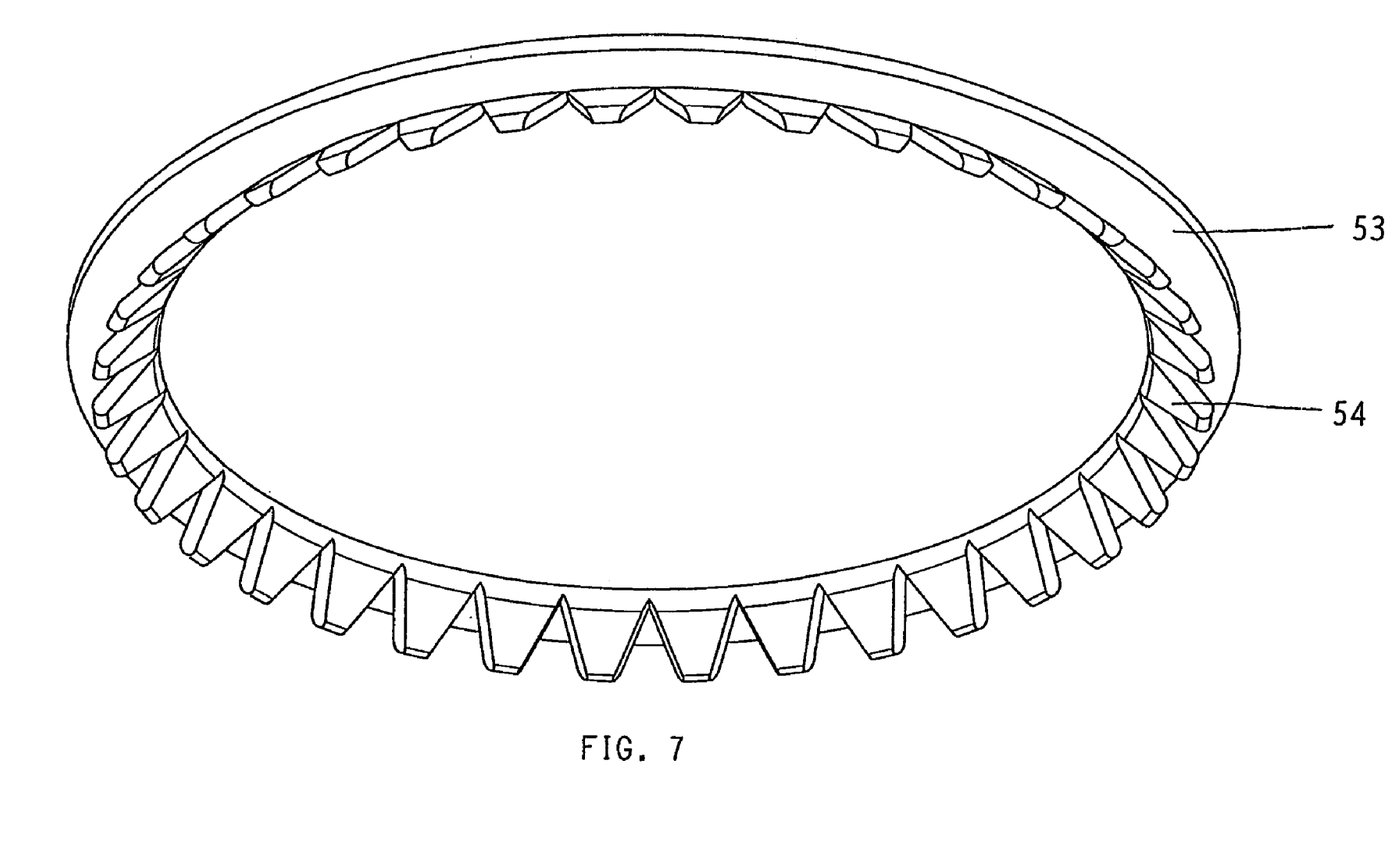
FIG. 7 illustrates one embodiment of the bearing ring in FIG. 6.

FIG. 7 illustrates a possible embodiment of bearing ring 53 with spring mechanism 54.

Figure 8:
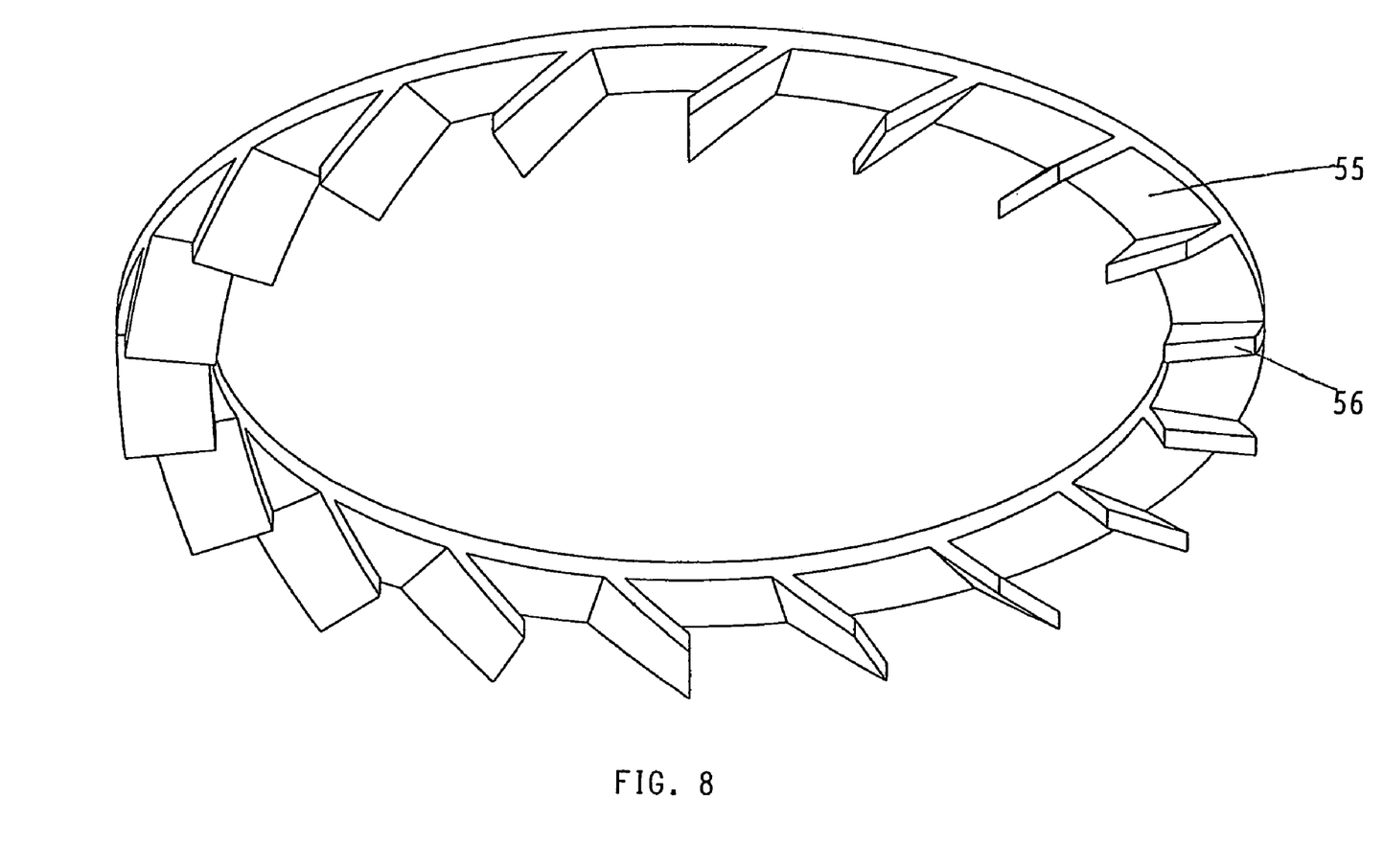
FIG. 8 illustrates a second embodiment of the bearing ring in FIG. 6.

FIG. 8 illustrates an alternative embodiment of bearing ring 55 with spring mechanism 56.

The invention claimed is:

1. A roller/foot device (1), characterised in that it comprises
    a cylindrical outer sleeve (10) with one end completely or partly closed (13) by an end surface and one open (17) end, where the outer sleeve's inner wall comprise first elongated ribs (11), which ribs extend in the outer sleeve's longitudinal direction with inclined end portions (15) with a step (16) and which ribs are arranged in parallel with grooves between round the circumference of the sleeve (10),
    a guide sleeve (20) arranged inside the outer sleeve (10) where the guide sleeve's outer wall comprises second ribs (21) where the width of each of the second ribs is equal to or less than the grooves between the first ribs (11) and which second ribs have end portions comprising at least one inclined surface (22,23) and grooves (24) between the ribs (21) which grooves (24) similarly have end portions with at least one inclined surface (26,27),
    a locking sleeve (30) arranged inside the outer sleeve (10) further out towards the open end of the outer sleeve than the guide sleeve (20), where the outside of the locking sleeve comprises third ribs (31) having the same width and being arranged at the same distance apart as the second ribs (21) in the guide sleeve (20), and which locking sleeve have inclined end portions (32) at an angle which is adapted to the first ribs' inclined end portions (15) and which inclined end portions (32) abut against the second ribs' end portions (22),
    a spring device where one end abuts against the outer sleeve's closed end (13) and the other end abuts against one end portion of the guide sleeve,
    a roller element (41) which is rotatably mounted abutting against the locking sleeve's (20) end portion located at the extreme end of the outer sleeve (10), with the result that
    when the roller element (41) is subjected to a force that acts inwardly in the outer sleeve (10), the spring device will exert a counterforce which presses the roller element (41) towards the outer sleeve's open end,
    when the force that acts inwardly in the outer sleeve is sufficiently great (greater than the force from the spring device),
    the second ribs (21) on the guide sleeve will slide in the longitudinal direction in the grooves on the outer sleeve (10),
    the end portions (32) of the third ribs will slide towards the end portions (15) of the first ribs, thus generating a movement of the locking sleeve (30) in the circumferential direction, the movement in the circumferential direction being stopped by the third ribs (31) abutting against the steps (16) on the first ribs' end surfaces (15) in a position where the roller element (41) is in its first position, or against the first ribs' (11) side walls in a second position where the roller element (41) is in its second position, depending on the roller element's initial position before the roller element was subjected to a force,
    when the force acting inwardly in the outer sleeve (10) is less than the force from the spring device, the roller element is pressed into an outer, third position and
    when the roller element (41) is subjected to repeated forces in the inward direction, the roller element will assume a sequence of positions in the outer sleeve's longitudinal direction, where the roller element in the first position protrudes from the outer sleeve and in the second position is completely inside the outer sleeve.

2. A roller device according to claim 1, characterised in that it further comprises several ball bearings and a locking ring and that
    the locking sleeve is provided with a cup-shaped recess in the end facing out towards the outer sleeve's open end, the recess being adapted to receive the ball bearings and the roller element, and
    the locking ring is designed to be able to be clamped into the locking sleeve so that the ball bearings and the roller element are held against the recess in the locking sleeve.

3. A roller device according to claim 2, characterised in that it further comprises a bearing ring which is adapted to fit between the locking ring and the ball bearings.

4. A roller device according to claim 3, characterised in that the bearing ring comprises at least one spring mechanism.

5. A roller device according to claim 1, characterised in that the end portions of the second ribs on the guide sleeve comprise two inclined surfaces.

6. A roller device according to claim 1, characterised in that the roller element is made of a soft/flexible material surrounded by a harder material.

7. A roller device according to claim 1, characterised in that the outer sleeve also comprises tension devices for attachment to a piece of furniture.

8. A roller device according to claim 1, characterised in that a protective pad is provided on the edge of the outer sleeve's open end.

9. A roller device according to claim 8, characterised in that the pad is doughnut-shaped with an outer diameter equal to or larger than the outer sleeve's outer diameter.

* * * * *